United States Patent [19]

Hilakos et al.

[11] Patent Number: 4,907,527
[45] Date of Patent: Mar. 13, 1990

[54] PULTRUSION APPARATUS AND METHOD FOR IMPREGNATING CONTINUOUS LENGTHS OF MULTI-FILAMENT AND MULTI-FIBER STRUCTURES

[75] Inventors: William Hilakos, Mt. Vernon; Dwight J. Patterson, Evansville, both of Ind.

[73] Assignee: General Electric Company, Mt. Vernon, Ind.

[21] Appl. No.: 133,419

[22] Filed: Dec. 15, 1987

[51] Int. Cl.⁴ .................................................. B05C 3/12
[52] U.S. Cl. ...................................... 118/67; 118/419; 118/423
[58] Field of Search .......................... 118/423, 419, 67

[56] References Cited

U.S. PATENT DOCUMENTS

| | | | |
|---|---|---|---|
| 244,872 | 7/1881 | Fischer | 118/419 |
| 2,276,284 | 2/1942 | Vori | 118/423 |
| 3,562,044 | 2/1971 | Erb | 118/419 |
| 3,981,162 | 9/1976 | Klier | 118/419 |
| 4,714,737 | 12/1987 | Patterson | 524/611 |

Primary Examiner—Janyce Bell
Attorney, Agent, or Firm—Martin Barancik; Joseph Eisele

[57] ABSTRACT

Apparatus and method for the pultrusion of polymeric resins reinforced with continuous lengths of multifilaments and/or fibers comprises wetting the lengths of multifilaments and/or fibers with a polymerization initiator, passing the wet length through an impregnating bath of a resin prepolymer and activating the polymerization in-situ.

3 Claims, 1 Drawing Sheet

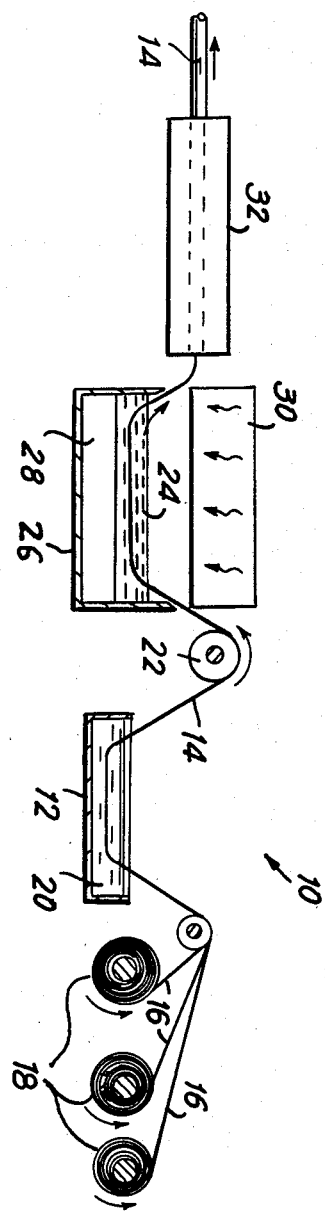

PULTRUSION APPARATUS AND METHOD FOR IMPREGNATING CONTINUOUS LENGTHS OF MULTI-FILAMENT AND MULTI-FIBER STRUCTURES

BACKGROUND OF THE INVENTION

1. Field of the Invention

The invention relates to methods and apparatus for impregnating continuous lengths of fiber and filament structures such as yarns, with polymeric resins.

2. Brief Description of the Prior Art

A wide variety of methods and devices have been proposed for impregnating yarns and like structures composed of textile fibers and/or filaments with polymeric resins; see for example the U.S. Pat. No. 3,413,196 which describes the impregnation of yarns of glass fibers. In general, one of the problems faced by the artisan has been the achievement of a product wherein the multitude of individual filaments or fibers such as glass fibers is completely wetted and encapsulated with the resin impregnant so as to eliminate air pockets or voids between fibers. Unless this is accomplished, fibers will be in physical contact with each other and free to abrade, one upon the other. This of course leads to a reduced life for the structure made up of the filaments or fibers. Additionally, the strength of the reinforced product will be less than it could be if all the reinforcement filaments or fibers are utilized by inclusion in the resin. The problem is especially difficult when the polymeric resin is a relatively viscous thermoplastic resin of a desirably high inherent viscosity.

To circumvent the problems associated with impregnating a continuous length of multifilaments and/or fibers with highly viscous resin compositions, artisans have considered the use of thermosetting resins, i.e.; low viscosity, synthetic polymeric resins which cross-link and gain in viscosity (actually they harden) under the influence of heat. The U.S. Pat. No. 4,285,749 contains a description of such methods together with their advantages and shortcomings.

However, thermosetting resins often lack the resiliency, flexibility and/or softness desired in many applications where their tendency to be hard and rigid is undesired. For this reason, the method of U.S. Pat. No. 4,285,749 may not be suitable in every instance where it is desired to impregnate a continuous length of multifilament and/or fibers with a polymeric resin. Thermoplastic resins may be preferred even if high viscosity thermoplasts are difficult to throughly impregnate the structure of the multifilament and/or fiber length.

It will immediately be recognized that the employment of relatively low viscosity resin impregnants would eliminate many of the difficulties encountered in achieving a complete wetting and impregnation of a multifilament and/or fiber structure. However, the use, for example of a low viscosity, thermoplastic polymeric resin to impregnate a continuous length of multifilaments and/or fibers raises a new set of problems related to the difficulty in maintaining a void-free resin matrix during the initial shaping of the impregnated structure. Low viscosity compositions tend to "flow away" from the multifilaments and/or fibers until sufficiently cooled to be fixed in position.

The method and the apparatus of the present invention is an advance in the art, enabling one to employ relatively low viscosity thermoplastic polymeric resin compositions to impregnate a continuous length of multifilaments and/or fibers, build the viscosity during or immediately prior to shaping the impregnated structure and obtain a product substantially free of voids between adjacent filaments and/or fibers.

SUMMARY OF THE INVENTION

The invention comprises a pultrusion assembly for impregnating a continuous length of multifilaments or multifibers, which comprises;
(a) a polymerization initiator bath vessel;
(b) a molten thermoplastic prepolymer resin container;
(c) a heat zone for polymerizing molten thermoplastic prepolymer resin; and
(d) means for tracting the continuous length sequentially through the bath vessel, the resin container and the heat zone.

The invention also comprises a method of impregnating continuous lengths of multifilament or multifiber yarns, employing the apparatus of the invention.

The term "pultrusion" as used herein is a coined term for a reinforced plastics technique in which continuous strands of resin-impregnated reinforcing material are pulled through the orifice of a die. The process yields continuous lengths of material with high unidirectional strengths, used for building siding, fishing rods, pipe, golf club shafts, moldable tapes and the like articles.

By the term "continuous length or multifilaments or multifibers" we mean any fibrous or filamentous structure such as a yarn, in which the fibers/filaments are sufficiently long to give a roving, tow or yarn of sufficient strength, under the processing conditions described hereinafter, to be pultruded through a molten thermoplastic polymer resin and a sizing die without such a frequency of breakage as to render the impregnated length unusable.

BRIEF DESCRIPTION OF THE DRAWINGS

The drawing is a side view of an embodiment apparatus of the invention, partially disassembled and partially cut-away, shown in operation.

DETAILED DESCRIPTION OF THE PREFERRED EMBODIMENTS OF THE INVENTION

The method and apparatus of the invention may be used to impregnate a wide variety of multifilament and multifiber structures in continuous lengths. Representative of such structures are multifilament or multifiber lengths of glass, carbon, jute, and of synthetic polymeric resins such as polyester, polyolefin, polyamide, aramid and like resins fabricated into for example, multifilament or multifibered yarns or threads. The method and apparatus of the invention are particularly useful to impregnate continuous lengths of glass fibers, and the following description will be directed to that embodiment as representative of materials which may be subjected to the method of the invention.

The term "glass fibers" is used herein to mean fibers of a glass composition in the form of filaments, strands, yarns, bundles, cords and the like; said fibers including cut, chopped or discontinuous fiber length as well as continuous filaments. The continuous lengths of glass fibers impregnated in accordance with the present invention may be untreated or treated with anchoring agents or the like to improve bonding to the polymeric resin impregnants.

The apparatus of the invention may be used to homogeneously impregnate glass fibers (or other fibers and filaments as previously described) structured in a continuous length, with a wide variety of thermoplastic polymeric resins such as synthetic, thermoplastic polyolefins, polyurethanes, polyamides, polyesters, polycarbonates and the like. Preferably, the resin compositions are applied to the continuous length in the form of relatively low viscosity prepolymers, i.e; incompletely polymerized forms such as oligomers and higher polymers which will gain in molecular weight and viscosity as polymerization is continued.

The term "low viscosity" generally means an intrinsic viscosity below about 0.40 dl/g as measured in methylene chloride at a temperature of 25° C. (for a polycarbonate) or an equal melt viscosity for other prepolymer compositions.

Although a wide variety of low viscosity oligomer and prepolymer resin compositions are known, including but not limited to prepolymers of polyolefins, polyurethanes, and the like, the invention will be described hereinafter in relation to the preferred use of a reactive polycarbonate oligomer such as a cyclic carbonate. Such oligomers are well known as is the method of their preparation; see for example U.S. Pat. No. 4,644,053 which is hereby incorporated herein by reference thereto.

Referring now to the drawing, a cross sectional in part, schematic drawing is shown of an embodiment apparatus 10 of the invention. The apparatus 10 comprises a vessel 12 which functions to contain a bath 20 and to receive a continuous length 14 of multifilaments and/or fibers made up component filaments or fibrous yarns 16 unwound from individual spools 18. Of course, the spools 18 and individual strands of yarns 16 do not form a part of the apparatus 10, which in fact can handle a previously made up continuous length structure 14 which is then fed into the bath 20 contained in the vessel 12. In the preferred embodiment described herein, the bath 20 is a polymerization initiator for effecting with heat a substantially complete polymerization of a polycarbonate oligomer as described above and hereinafter. The yarn 14 is throughly wetted with the bath 20 of polymerization initiator and then carried over a guide roller 22 and into a bath of molten, thermoplastic prepolymer resin 24 contained in a vessel 26. The vessel 26 may include heating means such as an electrical resistance heater or "hot plate" 28 for maintaining the resin 24 at any desired, predetermined temperature. A thermally energized or heated lid 30 partially closes the open vessel 26 to help maintain the desired temperature of the molten resin 24. Because the molten resin 24 is of a relatively low viscosity, it will impregnate the continuous length 14 during its traction through the resin 24. The resin 24 will penetrate the structue of the length 14 and come in contact with the polymerization initiator previously impregnated into the length 14. The continuous length 14 is then tracted through a heating zone of heater 32 wher the prepolymer resin 24 of impregnated length 14 in the presence of the initiator 20 is subjected to a final polymerization to immediately raise viscosity of the impregnant and fix the impregnant resin as a matrix for the now encapsulated and covered multifilament and or multi-fiber yarn 14. The initiator 20 with the added influence of heat promotes polymerization of the resin 20 in-situ in and on length 14. The yarn 14 may then be carried through a conventional die while the resin is still in a state of thermoplasticity, to finally shape and size the desired continuous length of impregnated structure (not shown in the drawing). Alternatively, a forming section may be included immediately prior to the polymerization heater 32 to preshape or form the continuous length 14 immediately before final polymerization of the impregnant. In this way, a reinforced length is obtained. The forming section may be a die to form the continuous length into any desired shape. A preferred die is one as described in the U.S. patent application Ser. No. 133,404 filed on the same day as the present application.

For example, the continuous length may be shaped into a rod, tube, bar, hollowed tube, I beams, L beams, flat tapes, or any other desired shape.

The following Examples describe the manner and the process of making and using the invention and set forth the best mode contemplated by the inventor for carrying out the invention.

EXAMPLE

Apparatus is provided meeting the description of the apparatus 10 shown in the accompanying drawings, with a terminating sizing die. The sizing die component has a die orifice of 1.58 mm. A continuous length of fiberglass yarn (250 yield fiberglass; Hybond 2079, PPG Industries) is threaded through the apparatus. A thermoplastic mixture of bisphenol-A carbonate oligomers; prepared as described in U.S. Pat. No. 4,644,053 and having an intrinsic viscosity of 0.1 dl/g (measured in methylene chloride at a temperature of 25° C.) is thermoplasticised in the container vessel 26 while the yarn is tracted through the apparatus 10 at a speed of 0.5 meters/minute under a tension of circa 18 kg. by a pair of Godet rollers and taken up on a reel. The temperature of the molten resin is circa 275° C. and is maintained at the same temperature. The vessel 12 is charged with a methylene chloride solution of a polymerization initiator (tetrabutylammoniumtertaphenylborate; although any other initiator or catalyst identified in the U.S. Pat. No. 4,644,053, supra., may be used). The heater 32 is heated to a temperature of circa 300° C. The rod-shaped product resin impregnated rod comprises 50% by weight of resin and visual examination under 10 power magnification does not reveal any resin voids between glass fibers.

What is claimed is:

1. Pultrusion assembly for impregnating a continuous length of multifilaments or multifibers, which comprises;
    (a) a polymerization initiator bath vessel;
    (b) a molten thermoplastic prepolymer resin container;
    (c) a heat zone for polymerizing molten thermoplastic prepolymer resin; and
    (d) means for tracting the continuous length of multifilaments or multifibers sequentially through the bath vessel, the resin container and the heat zone.

2. Apparatus of claim 1 which further comprises means of heating the resin container.

3. Apparatus of claim 1 which further comprises means of maintaining a predetermined temperature of the resin container.

* * * * *